United States Patent [19]
Petiet

[11] 3,989,138
[45] Nov. 2, 1976

[54] ORIENTATION DEVICE FOR SUBJECTS

[75] Inventor: Jakobus Petiet, Leiden, Netherlands

[73] Assignee: N.V. Leidsche Apparatenfabriek, Leiden, Netherlands

[22] Filed: Aug. 15, 1974

[21] Appl. No.: 497,754

[30] Foreign Application Priority Data
Aug. 23, 1973  Germany............................ 2342752

[52] U.S. Cl................................. 198/384; 221/164
[51] Int. Cl.²......................................... B65G 47/14
[58] Field of Search................. 198/276, 287, 209; 221/160, 162, 164, 167, 169, 170

[56] References Cited
UNITED STATES PATENTS

| | | | |
|---|---|---|---|
| 1,553,106 | 9/1925 | Purinton ............................. | 221/169 |
| 1,893,839 | 1/1933 | Hutchinson et al............. | 221/166 X |
| 2,625,313 | 1/1953 | Resina ............................ | 198/287 X |
| 2,924,355 | 2/1960 | Birkett............................. | 221/167 |
| 2,956,664 | 10/1960 | Brown et al. .................... | 198/209 X |
| 3,051,354 | 8/1962 | Zwald ................................ | 221/166 |
| 3,168,186 | 2/1965 | Young ................................ | 198/287 |
| 3,168,949 | 2/1965 | Aidlin ............................ | 198/287 X |
| 3,559,819 | 2/1971 | Large.............................. | 221/164 X |
| 3,637,065 | 1/1972 | Ruscitti.......................... | 198/287 X |
| 3,709,354 | 1/1973 | Petiet.................................. | 198/287 |

*Primary Examiner*—Evon C. Blunk
*Assistant Examiner*—Richard K. Thomson
*Attorney, Agent, or Firm*—Fleit & Jacobson

[57] ABSTRACT

A device for orienting generally round subjects, particularly caps, from a mass of randomly oriented subjects, comprising a slanted rotatable disc which is provided with a plurality of longitudinally movable pins equally arranged in a circular path coaxial with the center of the disc and near the perimeter thereof. The pins are arranged for upward movement in the region between a lower and an upper moving part of the disc in a manner as to extend beyond the upper surface for carrying subjects which are in a predetermined orientation and for delivering the subjects to a subsequent conveying means.

3 Claims, 15 Drawing Figures

ORIENTATION DEVICE FOR SUBJECTS

BACKGROUND OF THE INVENTION

Already known is a device for orienting generally round subjects from a mass of randomly orientated subjects, provided with a slanted rotating disc having orienting means for capturing correctly orientated subjects for delivery to a conveying means. See Dutch patent application No. 66.01895. In this known device, the orienting means comprise openings applied near the circumference of the disc, which openings are connected to a vacuum source. Correctly oriented caps, i.e. caps having their openings down, are pulled to the upper surface of the disc by the action of the vacuum, and are taken along to the upper region of the disc, where the caps are delivered to a conveying means, e.g. a conveying trough. Caps which are positioned on their sides cannot be pulled to the surface of the disc by the vacuum, because of their rounded shape. These caps remain in the mass of caps. Caps which are upside down, however, can be taken along by the disc, by the action of the vacuum, when no special provisions are applied to those caps to ensure rejection. To avoid this disadvantage, the upper ends of the caps are generally provided with irregularities so that they cannot be pulled to the upper surface of the disc by the action of the vacuum when they are upside down. It is therefore a disadvantage of this known device, that only specially shaped caps can be oriented if it is desired to reject those caps which are inverted.

Also known is a device in which caps are oriented by vibration. A disadvantage of such a device is, however, that caps made of natural rubber are oriented slowly and only with great difficulty because of their extremely high modulus of elasticity. Furthermore, when the vibration is too intense, those caps cannot be oriented at all.

It is an object of the invention to provide a device capable of orienting generally round subjects, such as caps, which avoids the above-mentioned disadvantages, and which enjoys several advantages never before known to the prior art.

SUMMARY OF THE INVENTION

The present invention relates to a device for orienting generally round subjects, particularly caps. from a mass of randomly orientated subjects, comprising a slanted rotatable disc provided with a plurality of longitudinally movable pins equally arranged in a circular path coaxial with the center of the disc, near the circumference thereof, and generally perpendicular to the upper surface of the disc. The pins are capable of moving upwardly in the region between lower and upper moving parts of the disc in such a manner as to extend beyond the upper surface of the disc and taking along subjects which are in a predetermined position and delivering the subjects taken along to a conveying means for the subjects.

The device according to the invention allows the orientation of a great variety of subjects without special provisions at the upper ends of the discs, and with a very high degree of accuracy.

Although the use of pins for the orientation of caps is known from U.S. Pat. No. 3,168,186, such a prior art device differs from that of the present invention in that it is provided with a horizontally arranged disc having pins, although movable, which always extend beyond the upper surface of the disc. The known device is further provided with an additional disc arranged at a slight distance above the main disc and having a smaller cross-section than the main disc. Both discs are rotated at the same speed and the caps to be oriented are guided to the edge of the additional disc, where they fall upon the pins. Incorrectly oriented caps are oriented correctly or are removed by a resilient means arranged above the path of the pins. It is a disadvantage of this known device that an additional disc is necessary for accurate operation, while this known device is only capable of orientating a rather small variety of caps.

It should be appreciated that the term "subjects" as used in this specification should be interpreted broadly. These subjects may be, for example, subjects for the closure of bottles, etc., but could also be, for example, piston-like subjects such as the small pistons used in syringes. It is an advantage of the present invention that it is unnecessary to take care to supply only small amounts of subjects or to employ special pre-orientation devices, as in the case of the above-mentioned prior art devices. The device according to the invention inherently serves as a storage holder so that special pre-orientation devices may be avoided.

In one embodiment of the present invention, the device is useful for orienting, for example, conical caps having an end which should be cut off before use, and a top which is moved to form a pouring spout. The device can be adjusted so that incorrectly shaped caps, for example caps with moulding protrusions, are retained, whereas correctly shaped caps are taken along with the pins in the disc and delivered for subject use. When the device is used for the orientation of these caps, a pulley-like disc is located between a lower and upper region of the disc and is rotatable about a horizontal shaft with substantially the same or a slightly faster speed than that of the slanted disc. The pulley-like disc serves to capture caps from the pins and deliver the same to a conveying trough.

According to another aspect, the invention provides a device for orienting hat-shaped caps, wherein the disc is provided with two coaxially arranged rows of pins. The pins in the respective rows are spaced so that the distance therebetween is smaller than the larger diameter of the caps, but greater than the smaller diameter thereof. In addition, the pins in their highest positions are designed to extend beyond the upper surface of the disc slightly less than the height of the smaller part of the subjects. Correctly orientated caps are taken along by the pins, whereas inverted caps are released by the pins and fall back into the mass of caps. An advantage of this embodiment over the known device according to the vibrating principle is that caps made of natural rubber as well as caps made of artificial kinds of rubber or other artificial materials can be oriented without readjustment of the device when the type of caps being oriented is changed.

According to still another embodiment of the invention, the pins in their lowest positions are retracted below the surface of the disc to such an extent as to form recesses in the disc, capable of receiving at least a portion of the caps. In this manner, a pre-orientation is achieved, which may be advantageous especially for subjects which are difficult to orient. For cylindrical piston-like subjects, for example, the upper ends of the pins are provided with protrusions in such a manner that the protrusions can enter a hole provided in the lower part of the subjects. When such a subject falls correctly in a recess and the corresponding pin moves upwardly, the subject is lifted and held on the pin. However, when a subject is inverted in a recess, the subject falls from the pin when the pin moves upwardly since the protrusion cannot enter the hole in the subject.

According to a further embodiment of the invention, the recesses in the regions above the pins are shaped considerably broader than the cross-section of the pins. This embodiment is particularly suitable for orienting odd-shaped caps such as those including a pouring spout. These caps cannot generally be oriented without great difficulty. In this embodiment, the caps are allowed to enter the recesses while the pins are in their retracted positions. The caps may enter the recesses in numerous possible orientations, but when the pins are moved upwardly, they will enter only the holes of the lower ends of correctly oriented caps, which thus remain standing on the pins. Incorrectly oriented caps fall from the pins.

The invention is discussed in further detail by the aid of the accompanying drawings in which, without intending to be limited thereby, only specific embodiments of the present invention are illustrated.

DETAILED DESCRIPTION OF THE DRAWINGS

Figure 1:
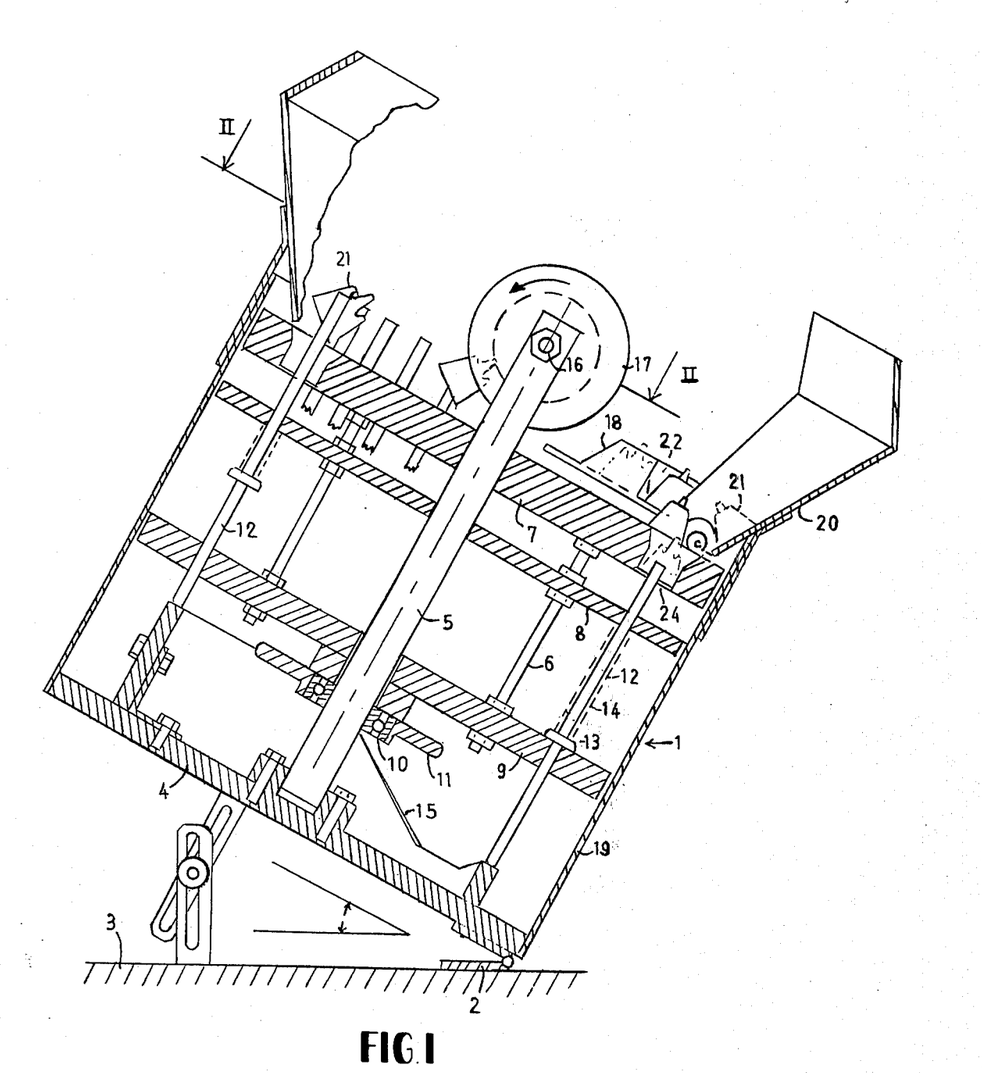
FIG. 1 illustrates a section through an embodiment of the device constructed in accordance with the present invention along the line I—I in FIG. 2.
Figure 2:
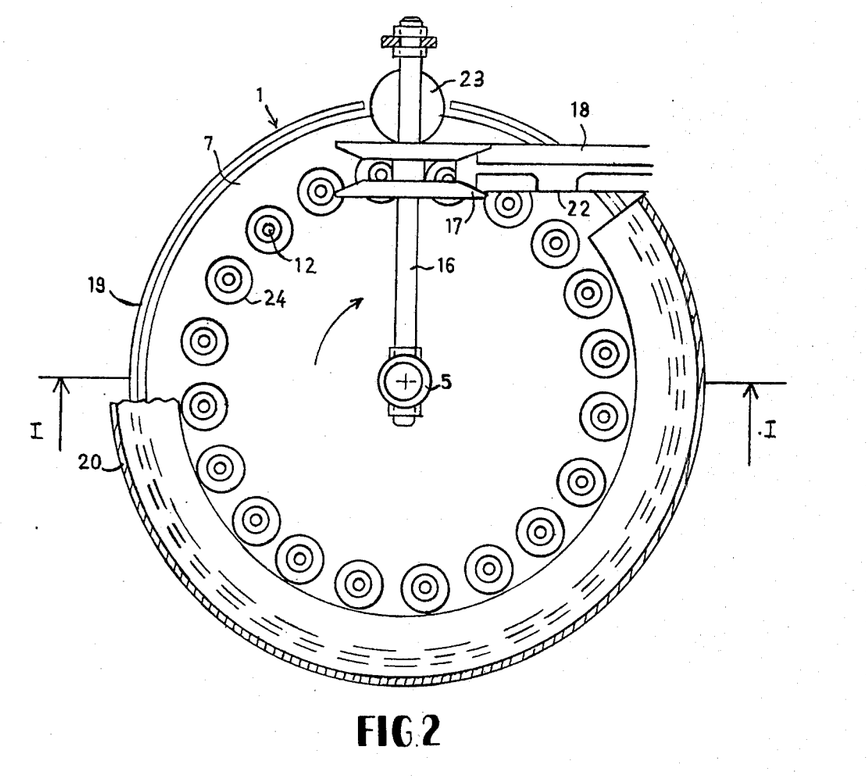
FIG. 2 illustrates a section through the embodiment according to FIG. 1 along the line II—II.
Figure 3:
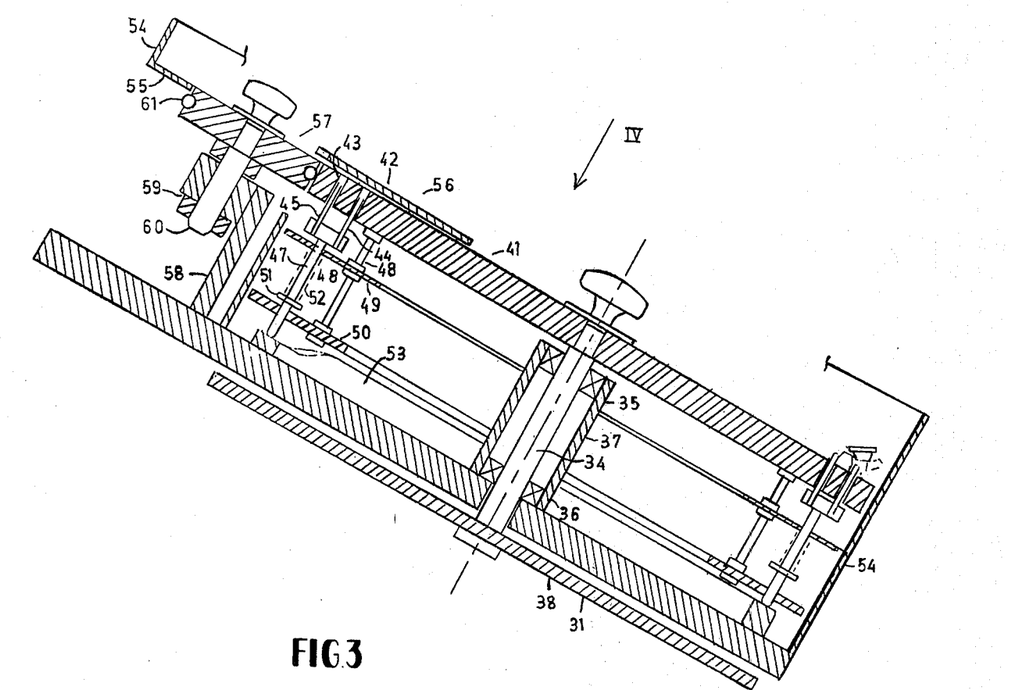
FIG. 3 illustrates a section through another embodiment of the device constructed in accordance with the invention along the line III—III in FIG. 4.
Figure 4:
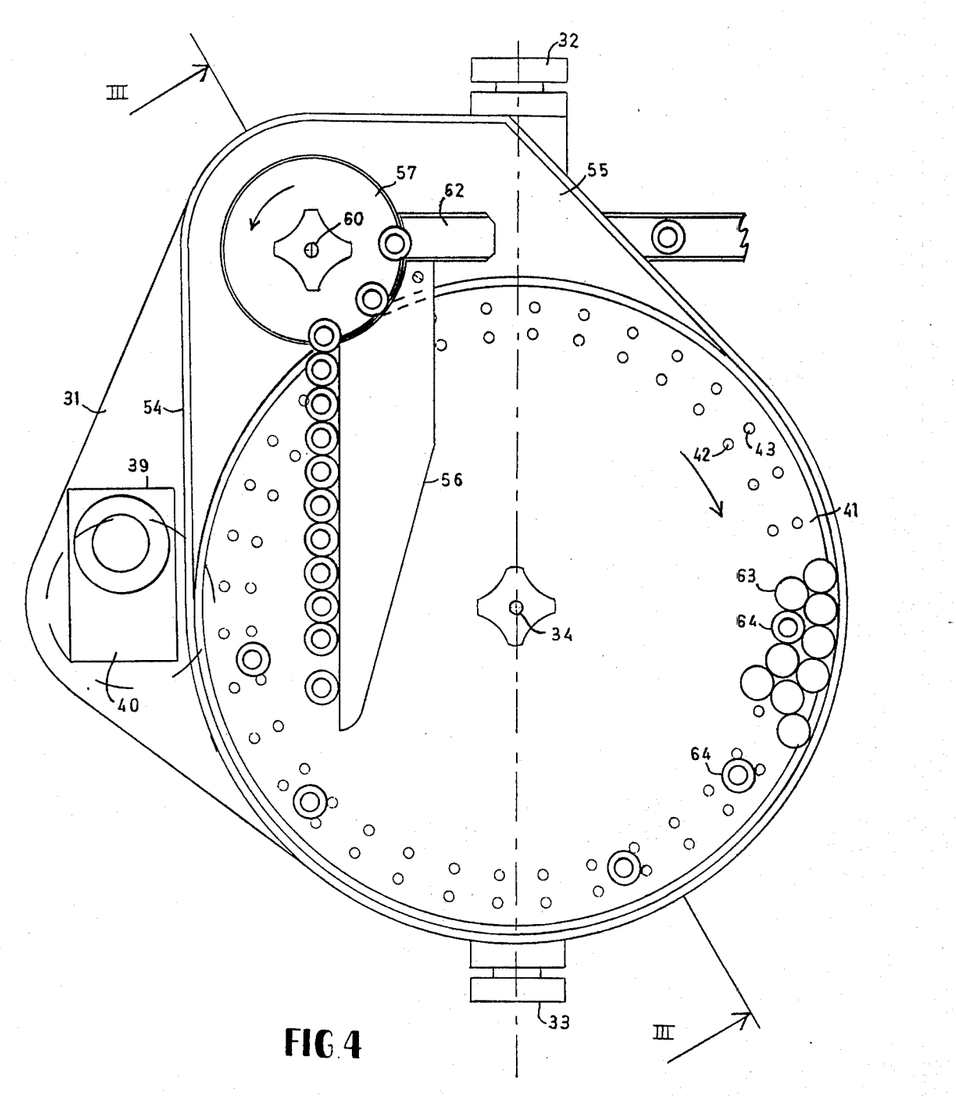
FIG. 4 illustrates a section through the embodiment according to FIG. 3, seen in the direction of the arrow IV.
Figure 5:
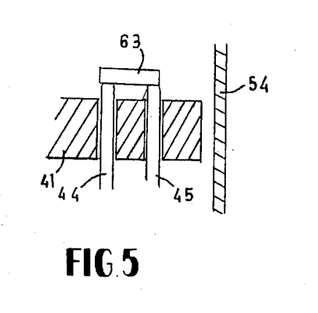
FIG. 5 illustrates a section through a part of the disc of the device shown in FIGS. 3 and 4 with a cap in an incorrect orientation.
Figure 6:
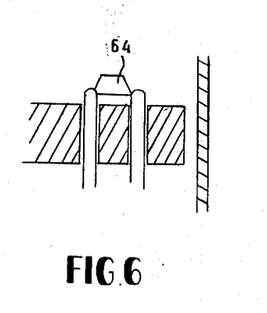
FIG. 6 illustrates a section as shown in FIG. 5, but with a cap in a correct orientation.

The device illustrated in FIGS. 1 and 2 consists of an orientating means shown generally at 1 adjustable about a pivot 2 mounted on a frame 3. The orientating means 1 is constructed on a base plate 4 to which an upwardly extending main shaft 5 is fixed. Three discs 7, 8 and 9, mutually connected by way of bolts 6, are rotatable about the main shaft 5. The lower disc 9 is rotatably connected about the main shaft 5 by means of ball bearings 10. Disc 9 is provided with a driving wheel 11 which, in turn, is driven by a motor (not shown). The disc 7 is provided with equally spaced openings 24 arranged in a circle coaxial with the main shaft 5. A pin 12 is longitudinally movable through each of the openings 24. Each opening 24 is shaped in a manner as to receive a cap, when the corresponding pin 12 is in its lowest position.

Each of the pins 12 is provided with a stop 13 mounted thereon in such a manner that the stop in its lowest position rests on the upper surface of the disc 9. When in this position, the upper end of pin 12 extends into the corresponding opening in the upper disc 7. A compression spring 14 is provided between each stop 13 and the adjacent lower surface of the middle disc 8. A cam path 15 is fixed to the base plate 4 and is shaped so as to urge the respective pins 12 to move beyond the openings in the disc 7. After having travelled about three quarters of a revolution from the position illustrated in FIG. 1, the extreme righthand pin 12 is retracted by means of its spring 14. In this region, a pulley-like disc 17, arranged above the disc 7, rotates about a horizontally arranged shaft 16, and transports the caps from the pins 12 to a conveying trough 18 tangentially arranged above the disc 7 behind the disc 17. The pulley-like disc 17 is driven by the disc 7 through a transmission means, of which only a wheel 23 is shown.

The base plate 9 is surrounded by a cylindrical protective casing 19, to which a holder flange 20 is fixed. The holder flange is provided with openings for the passage of the conveying trough 18 and the shaft 16.

The embodiment of the present invention described in the preceding paragraphs is suitable for orienting generally conical caps of the type used on bottles of liquid dishwashing detergent that is, wherein the end of the cap is cut off to open the bottle. Some of these types of caps are indicated in FIG. 1 at 21. When the device is operated, the discs 7, 8 and 9 rotate together, taking along the pins 12. The pins 12 are moved by the cam path 15 as previously described. Caps are thrown onto the disc 7 by a mechanism not illustrated in the drawings, or simply by hand. Some of the caps fall into the openings 24 and are moved underneath the remaining mass of caps on the disc 7. When the openings 24 have passed the mass of caps, the pins 12 move upwardly by the action of the cam path 15. Correctly oriented caps i.e. caps with their openings down as illustrated in FIG. 1, are taken along by the upwardly moving pins 12. Such caps adopt a slanted position on the pins 12, and maintain this position until they reach the pulley-like disc 17, where they are pushed between the flanges of the disc. The caps are turned slightly by the disc 17, so that they reach the conveying trough 18 in an orientation acceptable to the trough 18 and for traveling to their next destination. Caps which are not so correctly oriented are not taken along by the pins 12, since the pins cannot enter the openings of the caps. However, the mass of the caps ensures that a cap not advanced by a pin 12 will be taken along in a subsequent operating cycle.

The conveying trough 18 is provided with side walls, one of which has an opening 22 there through. This opening 22 permits excessive caps to be forced back into the mass of caps on disc 7.

It should be appreciated that the embodiment of the invention which has been described above serves not only to orient caps, but also to separate mis-shaped caps, e.g. caps with molding protrusions or caps having an incorrectly shaped top. Therefore, only well-formed caps are conveyed by the inventive device.

The angle of inclination of the orienting device is adjustable, so that the operation of the device can be adjusted in accordance with the particular shape of the caps to be oriented. The angle of inclination for the inventive device should be at least 35° to 50°, and preferably between 40° and 45°.

A further embodiment of the device according to the invention is illustrated in FIGS. 3 through 6. In this further embodiment, a base plate 31 is pivotably attached to a frame (not shown) by means of pivots 32 and 33. A main shaft 34 is rotatably supported by the base plate 31 by means of bearings 35 and 36 fixed in a bush 37. The shaft 34 protrudes through a hole in the base plate 31 and associates with a driving wheel 38 located beneath the base plate. The driving wheel 38 is driven by a motor 39 through a transmission means 40. The upper end of the shaft 34 is provided with a disc 41. Two concentric rows of equally spaced openings 42 and 43 are provided in the disc 41. Seen from the main shaft 34, the openings of row 42 are in line with those of row 43, i.e., are positioned on common radii. The distance between the rows is slightly smaller than the largest diameter of the caps to be oriented, and slightly greater than the smallest diameter of the caps, the caps being illustrated as being hat-shaped in this case. Two rows of pins 44 and 45 are movable through the respective openings 42 and 43. Each pin 44 of one row is connected to the corresponding pin 45 of the other row by means of a connecting piece 46, supported by a rod 47 guided through corresponding holes in two rings 49 and 50 below the disc 41. The rings 49 and 50 are connected to disc 41 by bolts 48. Each of the rods 47 is provided with a stop 51, and associates with a compression spring 52 between the stop 51 and the lower surface of the upper ring 49. The lower ends of the rods 47 are movable along a cam path 53 attached to the base plate 31.

The base plate 31 is provided with a protective casing 54, to which a supplementary plate 55 is attached. The upper surface of the supplementary plate 55 and the upper surface of the disc 41 are coplanar. An arm 56 is connected to the supplementary plate 55 in such a manner that it extends over the disc 41. A supplementary disc 57 is rotatably attached to a shaft 60 and is coplanar with the disc 41. The shaft 60 is supported by a sliding bearing 59 attached to an arm 58 which, in turn, is fixed to the base plate 31. A friction ring 61 applied to the circumference of the disc 57 causes a rotation of the disc 57 with the disc 41. The arm 56 is shaped so that the upper edge, which extends over the disc 41, is substantially parallel to the pivoting axis of the adjustment means. As seen best in FIG. 4, the arm 56 is cut away concentrically to the disc 57. The arm 56 is provided with a conveying trough 62 which is guided outwardly through a hole in the supplementary plate 55. As noted above, the device illustrated in FIGS. 3 through 6 is particularly suitable for the orientation of hat-shaped caps, having a brim portion and a crown portion such as caps for closure of small bottles and vials for medical purposes.

In operation, a mass of the caps is brought to the device and loaded on disc 41. The disc 41 is rotated in the direction indicated by the arrow in FIG. 4. In the lower region of the device, by way of cam path 53, the pins 42 and 43 are moved upwardly until they extend beyond the upper surface of the disc 41 to an extent corresponding to the height of the hat-shaped portion of the caps. See FIG. 5. Caps 63, having the brims oriented upwardly, are not taken along by the pins, since their smaller hat-shaped parts can pass between the pins. These caps thus remain in the mass of caps until they are reversed during the rotation of the disc 41. The caps 64 which have their brims down, however, are lifted by the pins and thus are moved upwardly along the incline with the disc 41. When the caps, taken along by the pins, reach the region above the arm 56, the pins are retracted to below the surface of the disc 41 through the combined action of springs 52 and the cam path 53. The caps taken along slide downwardly until they reach the upper edge of the arm 56. By the rotation of the disc 41, the caps are guided to the disc 57, which conveys the caps to the conveying trough 58.

If too many correctly oriented caps are delivered to the conveying trough, the excess caps pass by the conveying trough and slide back to the mass via the supplementary plate 55.

The inclination angle for the operation of the device is adjustable. Normally, an inclination angle of 35° to 50° is suitable, while an inclination angle of 40° to 45° is preferred.

A further embodiment of the present invention is shown in FIGS. 7 through 11. This embodiment, which is only partially illustrated, consists of a slanted disc 71 mounted on a shaft 72 and provided with a row of openings 73 near the perimeter of the disc. Pins 74 are longitudinally movable through the openings in such a manner that recesses are formed in the disc above the pins when in their retracted positions. The pins 74 are moved between the lower and upper region of the disc 71 by means of a cam path (not shown) to such an extent that they extend beyond the upper surface of the disc 71 when fully extended. A pulley-like device 75 is mounted above disc 71 and rotates in the direction of the arrow illustrated in FIG. 7 through the action of the transmission (not shown) and disc 71. After the disc 75, there is mounted a horizontal conveying trough 76. The side wall of the conveying trough 76 is provided with an opening 77 to allow excess caps to fall back into the mass of caps on disc 71. The disc 71 is surrounded by a protective casing 78. The upper end of each pin 74 is provided with a reduced-size protrusion 79 which is adapted to cooperate with corresponding holes in the subjects to be oriented by this device.

Figures 10, 11:
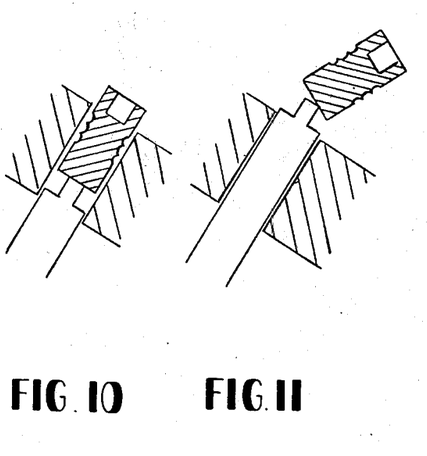

The subjects best suited for orientation by the embodiment illustrated in FIGS. 7 through 11 are small cylindrical pistons used, for example, in syringes. They fit in the recesses 73 defined in the disc 71 when the pins are in their retracted positions. When the device is operated and a mass of pistons to be oriented is brought onto the disc, the pistons may fall into the recesses, either with their holes down or up, as indicated, respectively, in FIGS. 8 and 10. When the hole is down, the protrusion 79 of the pin 74 enters the hole of the piston. Upon upward motion of the pin 74, the piston takes the position indicated in FIG. 9, i.e., the piston remains standing on the pin. In this position, the piston is guided to the disc 75, which captures the piston and delivers it to the conveying trough 76. When the piston falls in a recess with its hole up, the protrusions 79 cannot enter that hole, and the piston falls when the pin 74 moves upwardly (FIG. 11). In that case, the piston returns to the mass of pistons to be oriented.

Figure 7:
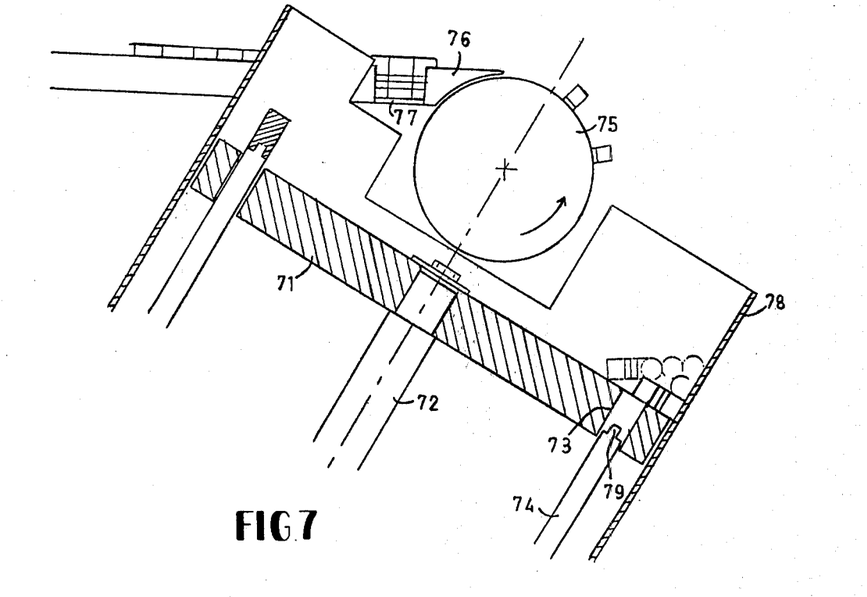
FIG. 7 illustrates a longitudinal section through a device constructed in accordance with a further embodiment of the present invention.
Figure 8:
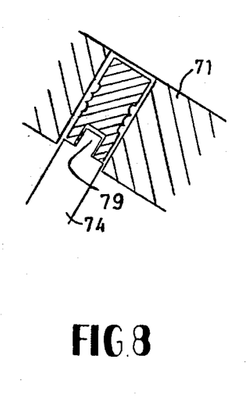
FIGS. 8 through 11 illustrate a section through a part of the device shown in FIG. 7, indicating two positions each for incorrectly and correctly oriented subject.
Figure 9:
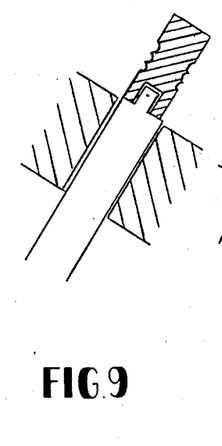

Though not specifically illustrated, for the best operation, this embodiment is adjustable for pivoting about the axis of the disc 75. It should also be appreciated that this embodiment is suitable to orient pistons made of rubber as well as pistons made of other materials.

Figure 12:
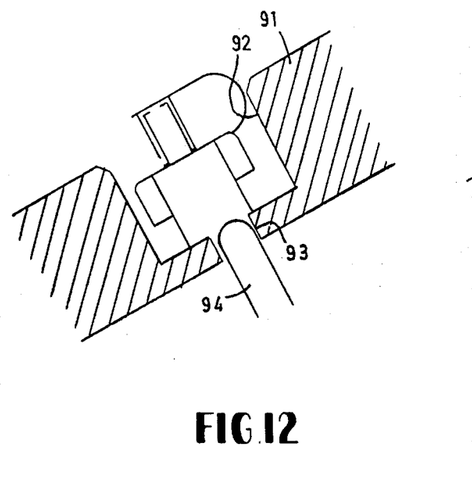
FIGS. 12 through 15 illustrate a section through a part of the disc of still another embodiment of the present invention for orienting specially shaped caps, showing two correctly and two incorrectly oriented caps.
Figure 13:
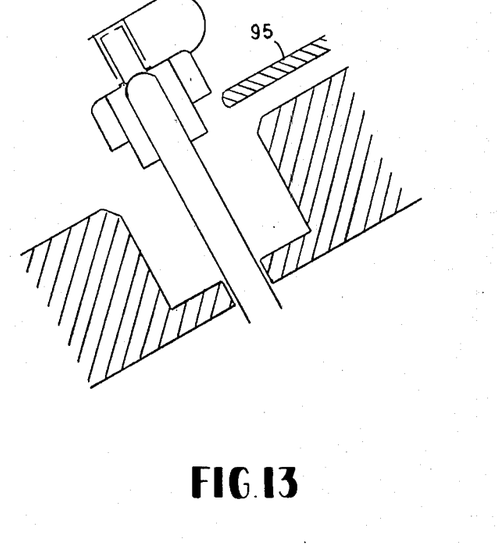
Figure 14:
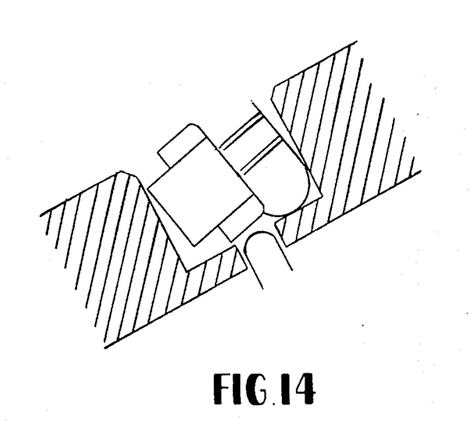
Figure 15:
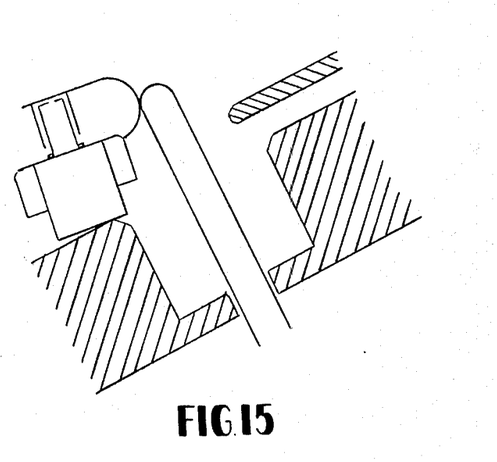

Still another embodiment of the present invention, similar to that described immediately above, is represented by FIGS. 12 through 15. This embodiment is capable of orienting caps which are difficult to orient, i.e., caps for closure of plastic bottles such as bottles for washing agents, which caps comprise a closure head for closing a pouring spout attached to it. In the drawings, a part of the slanted disc is indicated by 91. The disc is provided with a row of recesses 92, each of the recesses being provided with a smaller central opening 93 at the lower end thereof. A pin 94 is mounted for movement up and down through each of the openings 93. FIGS. 12 and 14 show the lowest position of the pin 94, and FIGS. 13 and 15 the highest position thereof. The pins 94 are moved upwardly somewhere between the lower and higher region of the disc and remain in the extended position until they reach a conveying trough, the entrance of which is indicated at 95.

As in the other embodiments of the present invention, a mass of caps to be oriented is delivered to the disc 91. Upon rotation of the disc, the caps can enter the recesses in numerous different orientations. The opening can be down (properly oriented) as indicated in FIG. 12, but a cap can also fall in the recess in other orientations, for example, as indicated in FIG. 14. Only when the opening is down is a cap lifted on a pin 94 when it is moved upwardly. In that case, the orientation of FIG. 13 is obtained, and the cap is delivered to the conveying trough 95. When a cap enters the recess in the position indicated in FIG. 14, it falls from the pin when it is moved upwardly, as may be seen in FIG. 15. In that case, the cap returns to the mass of caps ready for orientation.

Although the invention has been illustrated and described by specific embodiments, it should be understood that the invention is not restricted to such specifics. Rather, numerous modifications and variations are within the scope of the invention, and hence it is the intention that the present invention be limited only as set forth in the appended claims.

What is claimed is:

1. A device for orienting generally round subjects, such as hat-shaped subjects having a crown portion and a brim portion, comprising, in combination, a rotatably mounted disc having an upper surface slanted with respect to the horizontal, means for rotating said disc, a plurality of longitudinally movable pins arranged in first and second circumferentially extending rows adjacent the periphery of said disc, said rows being disposed coaxially with respect to the center of said disc with said pins in said rows being arranged in radially spaced, associated pairs and extending substantially perpendicular to said disc upper surface, means for moving each of said associated pairs of pins reciprocally between the lower and upper regions of said disc and between a retracted position below the upper surface of said disc and an extended position above the upper surface of said disc, said pins in each of said associated pairs being spaced apart a distance less than the diameter of the brim portion of the hat-shaped subjects but greater than the diameter of the crown portion of the hat-shaped subjects and wherein the pins in the extended position, extend beyond the upper surface of said disc for a distance slightly less than the height of the crown portion of the hat-shaped subjects and conveying means for receiving the subjects captured by said pairs of pins.

2. A device according to claim 1, wherein said disc is pivotably mounted on a pivoting axis; and further comprising an arm positioned above the disc and having an upper edge substantially parallel to said pivoting axis; and a rotable supplementary disc provided in the plane of said disc, which supplementary disc is capable of conveying the caps to said conveying means; and wherein the pins in the region above said upper edge retract to such an extent that the caps are conveyed through the slanted rotation of the disc.

3. A device according to claim 1, and further comprising a pulley-like disc located between the lower and higher region of said disc and rotatable about a horizontal shaft with substantially the same or slightly higher speed than that of the slanted disc, said pulley-like disc being capable of capturing caps from the pins and delivering them to said conveying means.

* * * * *